United States Patent Office 3,584,040
Patented June 8, 1971

3,584,040
METHOD FOR THE PREPARATION OF ACRYLIC ACID
Joseph W. Nemec, Rydal, Pa., and Francis W. Schlaefer, Pennsauken, N.J., assignors to Rohm and Haas Company, Philadelphia, Pa.
No Drawing. Continuation of abandoned application Ser. No. 465,209, June 18, 1965. This application July 22, 1968, Ser. No. 749,250
Int. Cl. C07c 57/04
U.S. Cl. 260—533N
6 Claims

ABSTRACT OF THE DISCLOSURE

Acrylic acid is prepared by reacting propylene, oxygen and water at a temperature range of about 300° to about 500° C. in the presence of a catalyst system consisting essentially of cobalt molybdate and copper telluride, wherein said copper telluride is employed in an amount by weight of about 0.10 to about 5.0%, based on said cobalt molybdate.

This application is a continuation of U.S. application Ser. No. 465,209, filed June 18, 1965, now abandoned.

This invention deals with a method for the preparation of acrylic acid. It more particularly deals with a method for the preparation of acrylic acid from propylene employing a specific, novel catalyst system.

The present invention comprises reacting propylene with oxygen and water in the presence of a catalyst system comprising cobalt molybdate and copper telluride at a defined temperature and within a limited ratio of reactants.

The general procedure of oxidizing propylene to form acrylic acid is well documented in the prior art with favorable results being obtained when a catalyst system containing certain complex oxides, such as cobalt molybdate, are promoted with certain Group VI A oxides with tellurium dioxide being particularly preferred. An undesirable feature of the tellurium dioxide promoted system is the lack of retention of the promoter. While the freshly promoted catalyst provides good yields of acrylic acid, the tellurium dioxide under the reaction conditions (400° to 500° C.) is rather rapidly eluted from the reactor and the yields decrease appreciably with increasing catalyst age. This phenomenon is not wholly unexpected, since tellurium dioxide sublimes at 450° C. This, of course, requires repromotion and recovery of the extremely toxic tellurium from the reactor effluent.

Accordingly, the present invention is concerned with a catalyst system which consistently gives good yields of product over prolonged periods of catalyst use.

The present catalyst system contemplates incorporation of copper telluride with a catalyst base composed of the calcined oxides of cobalt and molybdenum. The basis for the invention is the use of this novel catalyst system to provide high selectivity in the oxidation of propylene and thereby give good yields of acrylic acid over a prolonged period of operation.

The above-mentioned property of permanence is particularly important in commercial operations. Thus, with the present invention, once desired reaction conditions are achieved, as described hereinafter, production can be maintained for extended periods of time without the prior art necessity of modifying operating temperatures or feed stream compositions to adjust for the change in the catalyst system. Furthermore, the complex nature of the equipment needed to isolate the desired product makes it highly desirable that the composition of the effluent remain constant. This objective is readily realized in the process of the present invention.

Also, the high cost of tellurium commercially demands that any tellurium eluted from the bed must be recovered. By using the catalyst system of this invention, one skilled in the art is freed from the economic burden. Accordingly, use of the present invention eliminates the capital investment needed for this recovery equipment.

The attractiveness of the present invention is further enhanced when one considers the high toxicity of tellurium and its compounds. This problem is substantially completely eliminated by the present invention. Thus, since the present catalyst system is not subject to elution, there are no toxic vapors to sublime out of the reactor.

Also important is the fact that the polymers produced from the acrylic acid will be free from tellurium containing impurities. This is extremely important in enabling the acrylics to be employed in food packaging.

The present process is conducted in a temperature range of about 300° to about 500° C., preferably about 400° to about 450° C. The reaction may be conducted at atmospheric pressure or at pressures somewhat above atmospheric, such as about 1 to about 40 atmospheres. Generally, atmospheric pressure is preferred.

Oxygen may be used as such in the reaction or may be supplied as air. It is desirable in the present reaction to employ a diluent to facilitate control of this highly exothermic reaction. Therefore, if oxygen is employed as such, it is preferred to employ a gaseous diluent, such as carbon dioxide, nitrogen or the like. The carbon dioxide diluent is most economically provided from the carbon dioxide produced in the process. If oxygen is employed as the normal approximately 20% component of air, then nitrogen is already present as a useful diluent. Under certain circumstances, such as if recycling is intended, it is preferred to use oxygen itself. Otherwise, the use of oxygen as a component of air is quite satisfactory for the present purposes.

The propylene is employed in a ratio with respect to oxygen of 1:0.2 to 1:2, preferably 1:0.8 to 1:1.2. It is particularly desirable to have a substantially 1:1 ratio.

The ratio of water to propylene is about 1:1 to 15:1, preferably about 2:1 to 6:1. The contact time can range from 12 seconds to as low as 0.2 second, but about 0.6 second to about 4.0 seconds is preferred. Longer contact times generally produce higher propylene conversions, but this is accompanied by an increase in waste gas formation. One skilled in the art may balance these two factors to obtain the contact time which results in the most economical operations. Generally, operation from about 20 to about 60% conversion is satisfactory with about 30 to about 50% preferable. It is possible to operate at lower conversions where somewhat better selectivity is observed. The principal products of the present process are acrylic acid and its precursor acrolein. The acrolein can then, of course, be recycled to form additional acrylic acid which is the desired product of the present process. By recycling the by-product, acrolein, acrylic acid yields of 65% and above are consistently achieved. Small amounts of acetic acid, carbon monoxide and carbon dioxide are also formed but their formation is held at a very low level by virtue of the high oxidative selectivity of the present invention.

In order to achieve high yields of desired product under commercial conditions of reaction, one employs a catalyst system comprised of cobalt molybdate and copper telluride. The cobalt molybdate is considered to be an intimate physical mixture of the oxides of molybdenum and cobalt and is preferably employed as pellets or other moderately sized particles, such as 10–20 mesh or larger particles, optionally on a carrier, such as silica, zirconia, pumice and the like. The copper telluride, which has the formula $$Cu_2Te$$

is employed in the range of about 0.10 to about 5.0%, preferably about 0.10 to about 1.0%, based on the weight of the cobalt molybdate. The copper telluride is employed in comminuted form of such a particle size that it passes through an 80 mesh screen. The copper telluride is normally mixed with the cobalt molybdate by any standard mixing procedure, such as tumbling and the like, and is readily adsorbed by the cobalt molybdate. Moderate care should be employed during the mixing operation to avoid fracture of the cobalt molybdate.

The present invention may be more fully understood from the following illustrative examples.

PREPARATION OF CATALYST SYSTEM

A 5 l. aqueous solution containing cobalt (1776 parts by weight as the nitrates) and molybdenum (1064 parts by weight as ammonium molybdate) was heated, with stirring at 40° C. To this solution there was added dropwise over a 20-minute period 960 ml. of aqueous 15.3% ammonium hydroxide. The precipitate was filtered, washed with 9 l. of deionized water and then slurried with water to form a thick paste. The paste was tightly packed into a stainless steel tube, then heated in a stream of air at 650° to 750° C. for 32 hours. The calcined material was finally ground to 10–20 mesh. The calcined catalyst contained 24% cobalt and 47% molybdenum. This material (160 parts by volume) was then thoroughly mixed with 0.44 part by weight of finely ground copper telluride to form the catalyst composition of the present invention.

EXAMPLE 1

A stainless steel tubular reactor, equipped with a preheater, was charged with 160 ml. of the aforementioned catalyst and heated in a molten salt bath at 438° C. A gas stream having a propylene/air/water ratio of 1:4.6:4 was passed through the catalyst bed for a period of 52 hours. The contact time was 2.9 seconds. The yield of acrylic acid was 43% while the propylene conversion was 27%. The yields of acrolein, acetic acid and waste gas (carbon monoxide and dioxide) were 33, 10 and 15%, respectively.

EXAMPLE 2

Subsequent to the above experiment, another experiment employing the very same catalyst was conducted. With the exception of the temperature, which was 441° C., all conditions were similar to those of Example 1. The product yields were acrylic acid, 43%, acrolein, 36%, acetic acid, 9.7% and waste gas, 11%. The propylene conversion was 30%.

EXAMPLE 3

A catalyst bed, similar to that described in Example 1, but which had been used in acrylic acid production for 61 hours, was heated to 432° C. Using a contact time of 4.0 seconds, a feed stream, similar to that of Example 1, was passed through the catalyst bed for a period of 2.08 hours. The percent yields of acrylic acid, acrolein, acetic acid and waste gas were 47, 30, 10 and 13, respectively. The propylene conversion was 33%.

EXAMPLE 4

A feed stream containing propylene, air and water in the ratio 1:4.6:4.0 was run through a catalyst bed similar to that described in Example 1. The contact time was 2.9 seconds and the temperature was 412° C. The yield of acrylic acid was 36% and the yield of acrolein was 43%. The yields of acetic acid and waste gas were 12 and 9.3%, respectively, while the propylene conversion was 13%.

EXAMPLE 5

A stainless steel tubular reactor, equipped with a preheater, was charged with 80 ml. of the cobalt molybdate-copper telluride catalyst system and heated in a molten salt bath at 454° C. A feed stream having a propylene/air/water ratio of 1:4.6:4 was passed over the catalyst bed for 5.1 hours. The contact time was 0.8 second. The yield of acrylic acid was 46% and the propylene conversion 22%. Acrolein, acetic acid and waste gas were also produced in yields of 34, 8.9 and 12%, respectively.

EXAMPLE 6

Cobalt molybdate (160 ml. of 10–20 mesh particles) was thoroughly mixed with 3.52 g. of pulverized copper telluride and the entire mixture charged to the reactor. While employing a 2.9 seconds contact time and a 437° C. reactor temperature, a feed stream, similar to that described in Example 5, was passed over the bed for a period of 1.3 hours. The propylene conversion was 33% while the yields of acrylic acid, acetic acid, acrolein and waste gas were 42, 3.8, 40 and 15%, respectively.

EXAMPLE 7

A reactor was charged with 270 ml. of a catalyst as described in Example 5. The catalyst bed was then used in acrylic acid production for 1000 hours. After the 1000 hours of production, the propylene/air/water ratio was held at 1:4.6:4 but the stream containing acrolein, instead of being collected, was recycled back to the reactor. The contact time was 4 seconds while the reactor temperature was 420° C. After reaching a steady state, the system was run for another 1.2 hours. The yield of acrylic acid was 68% while the propylene conversion was 39%. Acetic acid and waste gas were also formed in 9 and 21% yields, respectively.

EXAMPLE 8

This example was conducted with the catalyst bed employed in Example 7. The feed stream ratio, however, was 5.9 carbon dioxide/2.1 water/1.1 oxygen/1.0 propylene. The reactor temperature was 454° C. and the contact time 3.5 seconds. The duration of the experiment was 5.2 hours. The yield of acrylic acid was 28% while the propylene conversion was 47%. Acetic acid, acrolein and waste gas were also produced in 2.9, 56 and 13% yields, respectively.

EXAMPLE 9

A reactor was charged with 80 ml. of the catalyst system, as described in Example 5. A feed stream having a propylene/air/steam ratio of 1:4.6:12 was passed over the bed for 1.3 hours. The reactor temperature was 424° C. while the contact time was 1 second. The yield of acrylic acid was 39% and the propylene conversion was 22%. The yields of acetic acid, waste gas and acrolein were 7.8, 10 and 43%, respectively.

What is claimed is:

1. A method for the production of acrylic acid comprising reacting propylene, oxygen and water in the range of about 300° to about 500° C. in the presence of a catalyst system consisting essentially of cobalt molybdate and copper telluride, wherein said copper telluride is employed in an amount by weight of about 0.10 to about 5.0%, based on said cobalt molybdate, and in which the range of propylene to oxygen is about 1:0.2 to 1:2 and water to propylene is about 1:1 to 15:1.

2. A method for the production of acrylic acid comprising reacting propylene, oxygen and water in the range of about 300° to about 500° C. in the presence of a catalyst system consisting essentially of cobalt molybdate and copper telluride, wherein said copper telluride is employed in an amount by weight of about 0.10 to about 1.0%, based on said cobalt molybdate, and in which the range of propylene to oxygen is about 1:0.8 to 1:2 and water to propylene is about 2:1 to 6:1, in which contact times of about 0.2 to about 12 seconds are employed.

3. A method for the production of acrylic acid comprising reacting propylene, oxygen and water in the range of about 400° to about 450° C. in the presence of a catalyst system consisting essentially of cobalt molybdate and copper telluride, wherein said copper telluride is employed in an amount by weight of about 0.10 to about 1.0%, based on said cobalt molybdate, and in which the range of propylene to oxygen is about 1:0.8 to 1:2 and water to propylene is about 2:1 to 6:1, in which contact times of about 0.6 to about 4.0 seconds are employed.

4. A method according to claim 2 wherein said oxygen is employed as such, along with an inert, gaseous diluent and in which any acrolein formed is recycled to form additional acrylic acid.

5. A method according to claim 2 wherein said oxygen is supplied as a component of air wherein the reaction is conducted at substantially atmospheric pressures.

6. A method according to claim 1 wherein any acrolein formed is recycled to produce additional acrylic acid.

References Cited

UNITED STATES PATENTS 3,439,045  4/1969  Cahoy et al. _____ 260—604

FOREIGN PATENTS 971,666  9/1964  Great Britain _____ 260—533

JAMES A. PATTEN, Primary Examiner

R. D. KELLY, Assistant Examiner

U.S. Cl. X.R.

252—439; 260—604R